(12) United States Patent
Kennedy

(10) Patent No.: US 9,720,539 B2
(45) Date of Patent: Aug. 1, 2017

(54) TABLET COMPUTER SCREEN AND MOBILE PHONE SCREEN TO DIGITAL I/O CONVERTER

(71) Applicant: Robert Dennis Kennedy, Honolulu, HI (US)

(72) Inventor: Robert Dennis Kennedy, Honolulu, HI (US)

(73) Assignee: Robert Dennis Kennedy, Honolulu, HI (US)

( * ) Notice: Subject to any disclaimer, the term of this patent is extended or adjusted under 35 U.S.C. 154(b) by 164 days.

(21) Appl. No.: 14/552,494

(22) Filed: Nov. 25, 2014

(65) Prior Publication Data

US 2016/0147358 A1 May 26, 2016

(51) Int. Cl.
*G06F 3/041* (2006.01)
*G06F 1/16* (2006.01)
*G06F 3/039* (2013.01)
*G06F 3/044* (2006.01)

(52) U.S. Cl.
CPC .......... *G06F 3/0416* (2013.01); *G06F 1/1632* (2013.01); *G06F 3/039* (2013.01); *G06F 3/044* (2013.01)

(58) Field of Classification Search
CPC ...... G06F 3/0416; G06F 3/0488; G06F 3/044; G06F 1/1632; G06F 3/03547; G06F 3/046; H04B 1/38; H04B 1/3888; H05K 1/16; H05K 5/00; A45C 2011/002
See application file for complete search history.

(56) References Cited

U.S. PATENT DOCUMENTS

| | | | | |
|---|---|---|---|---|
| 6,920,338 B2 * | 7/2005 | Engstrom | ........... | H04M 1/0202 455/550.1 |
| 2003/0073462 A1 * | 4/2003 | Zatloukal | .............. | G06F 1/1626 455/558 |
| 2004/0140993 A1 * | 7/2004 | Geaghan | ................ | G06F 3/044 715/702 |
| 2006/0078207 A1 * | 4/2006 | King | .................. | H04N 1/00244 382/229 |
| 2012/0278031 A1 * | 11/2012 | Oda | ...................... | G06F 3/0416 702/150 |
| 2013/0163681 A1 * | 6/2013 | Wolter | .................. | H04L 7/0091 375/257 |
| 2013/0311689 A1 * | 11/2013 | Kennedy | .............. | G06F 1/1626 710/69 |
| 2013/0328770 A1 * | 12/2013 | Parham | ................. | G06F 3/0304 345/157 |
| 2014/0125590 A1 * | 5/2014 | Flagg | ..................... | G06F 3/017 345/157 |

* cited by examiner

*Primary Examiner* — Nicholas Lee
*Assistant Examiner* — Gerald Oliver

(57) ABSTRACT

An adapter that fits to a touchscreen of a tablet computer or mobile phone enabling input and output to and from the device. Output is achieved by a plurality of phototransistors arranged in a matrix which interpret a plurality of video image dots, squares or groups of pixels on the tablet computer or mobile phone touchscreen converting them to 1s (ones) or 0s (zeroes).
Input is achieved by a plurality of conductors which are selectively electrified by control electronics to a charge sufficient to disrupt the field or capacitance of the touchscreen finger tip sense at a plurality of locations on the screen. A program(s) on the tablet computer or mobile phone interprets the electronically controlled touches as data.

15 Claims, 18 Drawing Sheets

TABLET COMPUTER SCREEN AND MOBILE PHONE SCREEN TO DIGITAL I/O CONVERTER

FIELD OF THE INVENTION

This invention relates to an input and output adapter for tablet computer touchscreens and mobile phone touchscreens and more particularly to allow tablet computers and mobile phones to be used as continuous monitoring and control devices.

BACKGROUND OF THE INVENTION

In general commercially available off the shelf computers, tablets and mobile phones have increasingly less input and output (I/O) capability aside from wireless. Increasingly parallel printer ports, serial ports, mini-card slots (such as SD, SD-micro), and bus or I/O card slots have been eliminated with the exception of USB (Universal Serial Bus) and HDMI (High-Definition Multimedia Interface). The USB available on many hand held computers and smart phones does not provide host capability.

Despite the fact that mobile phones and tablet computers have become multiprocessor platforms well suited to be real-time monitoring and control devices individually or in a larger system with real-time constraints these devices have been increasingly limited by limited input and output.

In particular it is more difficult to use a tablet computer or mobile phone in a monitoring and control system as was done prior with computers such as the desktop personal computer which had bus slots (such as the ISA, VESA, PCI to name a few) or parallel ports which could be used for input and output found on the earliest desktop units. VME was also widely used as a bus wherein I/O could be customized in various combinations of discrete inputs and outputs and analog inputs and outputs via cards. Other customized cards for motion control (motor control), robotics and many other applications existed.

In view of these disadvantages, it is the object of this invention to make new increasingly restricted tablet computers and mobile phones more general purpose by this converter as an angled surface, enclosure, magnetic stick on shape, slot, rack, sleeve, clear material which uses the tablet computer or mobile phone's existing human interface (touchscreen) and software (EG MP4 player application, PNG image viewer application) and customized software to provide input and output (I/O) to the tablet computer or mobile phone used in the same manner as older PCI bus cards or VME bus cards to provide digital and analog I/O.

SUMMARY OF THE INVENTION

A digital input and output converter for tablet computers and mobile phones that overcomes disadvantages of prior art by using the common touchscreen found on most tablet computers and mobile phones to provide input and output allowing tablet computers and mobile phones to be used for monitoring and control. For the input converter: a grid overlays the touchscreen and has a plurality of conductors electrically charged such that an electric field disturbs the touchscreen to trigger the mobile phone or tablet computer touchscreen.

A plurality of locations on the screen are used to receive input data. Software on the mobile phone or tablet computer relies on one of the signals (touch location) as a clock. this allows a stream of ones and zeros to be interpreted serially or in parallel in a bus cycle. A lack of touch sense during data transfer indicates a 1 with the reverse, a touch sensed, indicating a 0. The inverse logic is also available wherein a lack of touch sense during data transfer indicates a 0 and a touch sensed indicating a 1.

The output converter is achieved by a plurality of phototransistors arranged in a matrix which interpret a plurality of video image dots, squares or groups of pixels on the tablet computer or mobile phone screen converting them to 1s (ones) or 0s (zeroes).

Where wireless communication is not suitable for many systems such as automotive applications (eg driver assisted or computer driven automobiles), automated rail, flight applications, refinery controls, and semiconductor capital equipment gas control where immunity from hackers is paramount to safety. The converter offers the advantage of not being vulnerable to jamming of wireless or spoofing of wireless signals since the converter is a closed system and can be utilized without wireless to generate or receive signals.

BRIEF DESCRIPTION OF THE DRAWINGS

The foregoing and other objects and advantages of the invention will become more clear with reference of the following detailed description as illustrated by the drawings in which.

DETAILED DESCRIPTION

FIGS. 1 through 8 detail a monitoring and control system according to this invention. Nevertheless, this description should be considered to apply to any type of data that requires I/O signals to and/or from a tablet computer or mobile phone. Thus, while this embodiment details input and output converters for monitoring and control using a single tablet computer or mobile phone and this embodiment details a monitoring and control system with a plurality of mobile phones/tablet computers, the system herein can be adapted to a variety of other data, data I/O, and data monitoring such as telemetry, pharmaceutical delivery, entertainment, games, pattern recognition, encryption, industrial controls, wireless probe devices, security devices, process controls, manufacturing facilities, robots, automated guided vehicles, unmanned aerial vehicles, food and beverage automation, boiler control, furnace control, avionics, aircraft/watercraft/spacecraft navigation, aircraft flight control, watercraft/spacecraft control, watercraft/spacecraft displays, aircraft flight displays, vehicle control, sound transmission, automotive displays, engine control, climate control, home automation, medical, wireless hand held data acquisition, optical controls, photography, electric generator coil manipulation, electric motor control, musical instrument, musical amplification, musical instrument sound manipulation, radar control and signal processing and display, cash register, weather instrumentation, sewage processing, water treatment, data acquisition, construction equipment, hydraulic controls, automatic teller machines.

Figure 1:
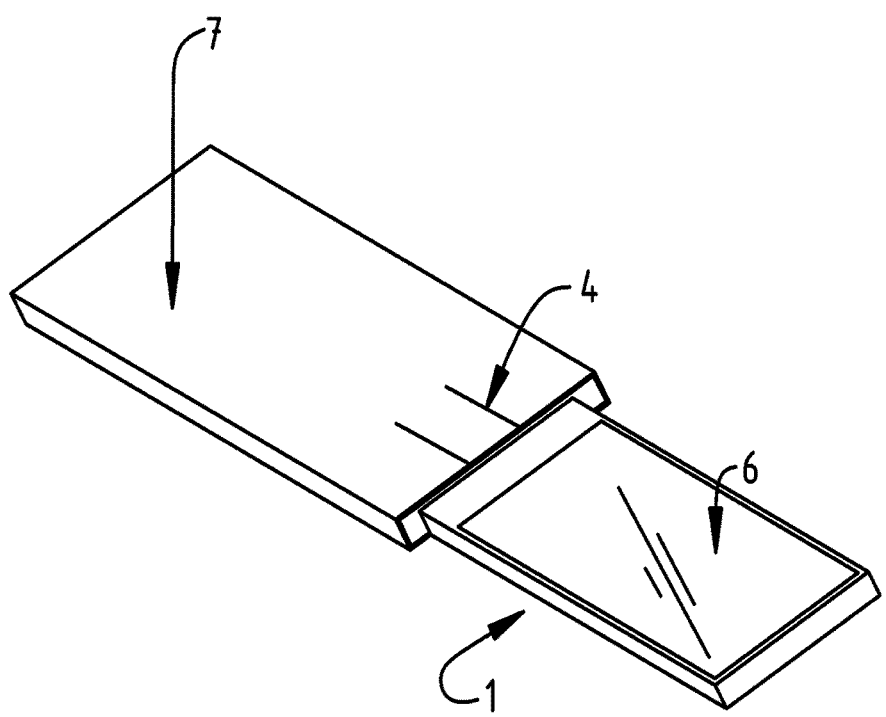
FIG. 1 is a perspective view of a tablet computer and mobile phone input and output converter enclosure type system according to this invention
Figure 2:
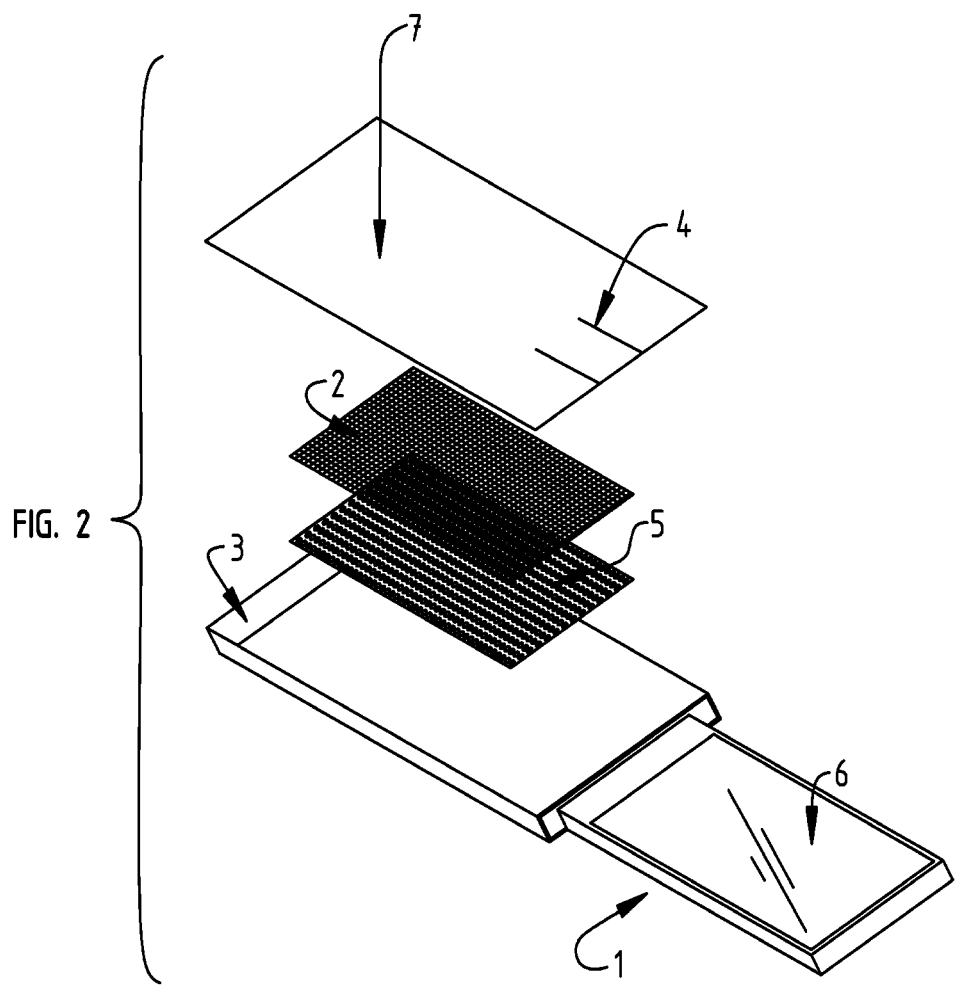
FIG. 2 is an exploded view of the input and output converter enclosure type system of FIG. 1

FIG. 1 and FIG. 2 detail a single slot hinged or unhinged enclosure system 7 wherein the mobile phone or tablet computer 1 slides into position and secures with a latch 4 so that the touchscreen 6 is aligned with an input converter 2 and output converter 5 and any other interface electronic connection and back-plane 3.

Figure 3:
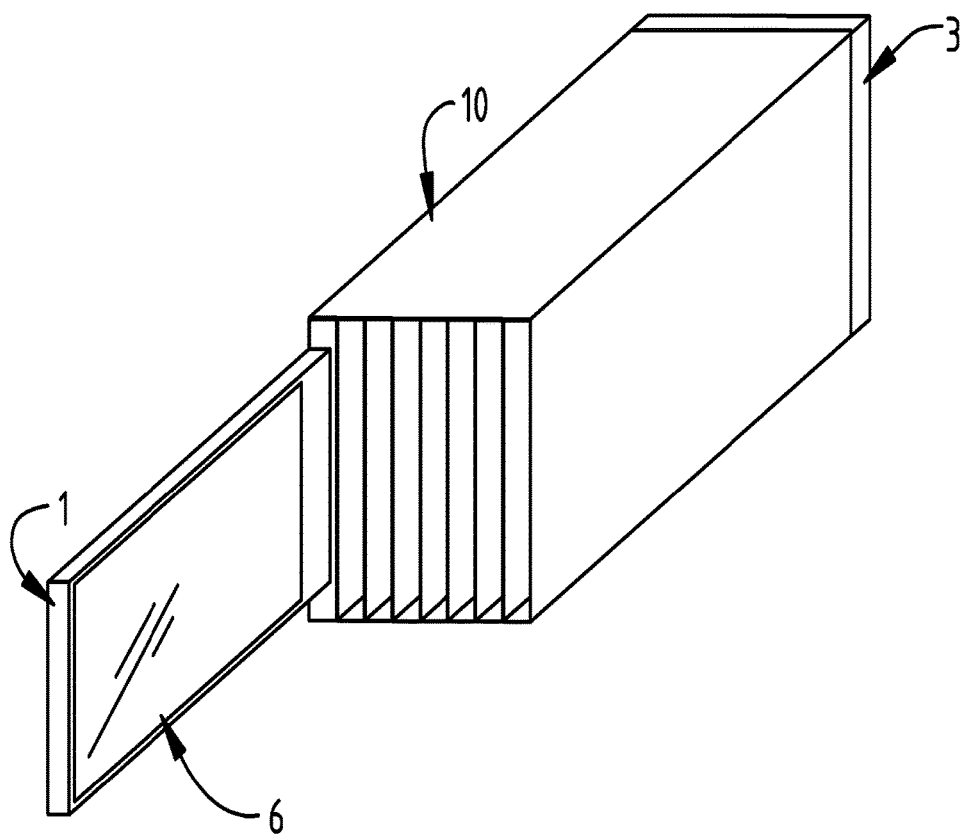
FIG. 3 is a perspective view of a rack system and including a plurality of tablet computer and or mobile phone converters including the combined input and output converters according to this invention
Figure 4:
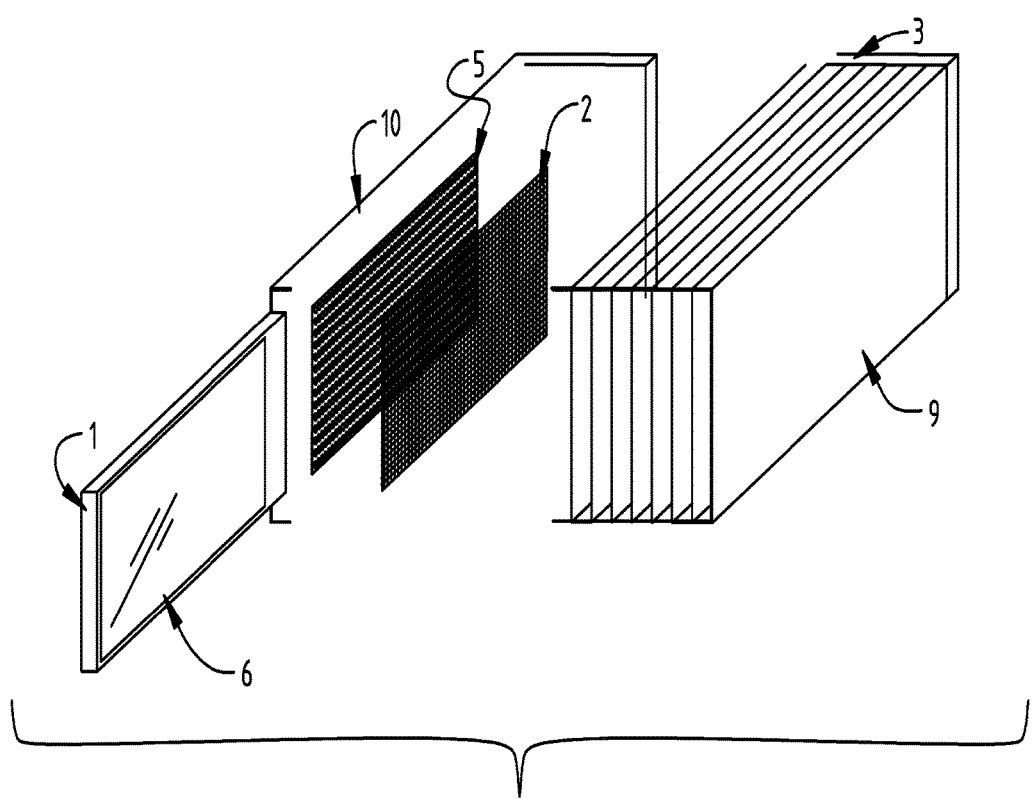
FIG. 4 is an exploded view of the input and output converter combination showing one of a plurality of slots of FIG. 3

FIG. 3 and FIG. 4 detail a rack 9 system consisting of a plurality of mobile phones or tablet computers 1 wherein each slot 10 contains an input converter 2 and an output converter 5 aligning with the touchscreen 6, and any other interface electronic connection and back-plane 3.

Figure 5:
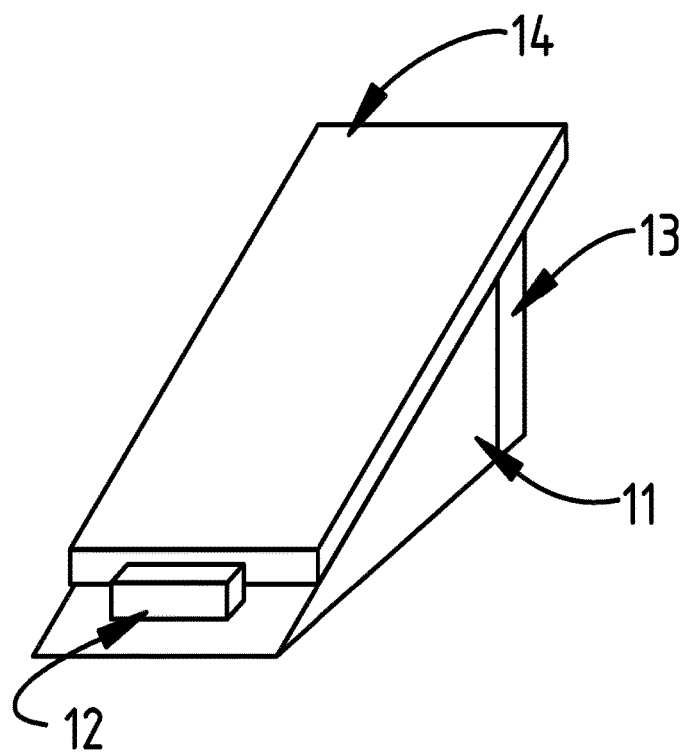
FIG. 5 is a perspective view of an angled tablet computer and mobile phone input and output converter system according to this invention
Figure 6:
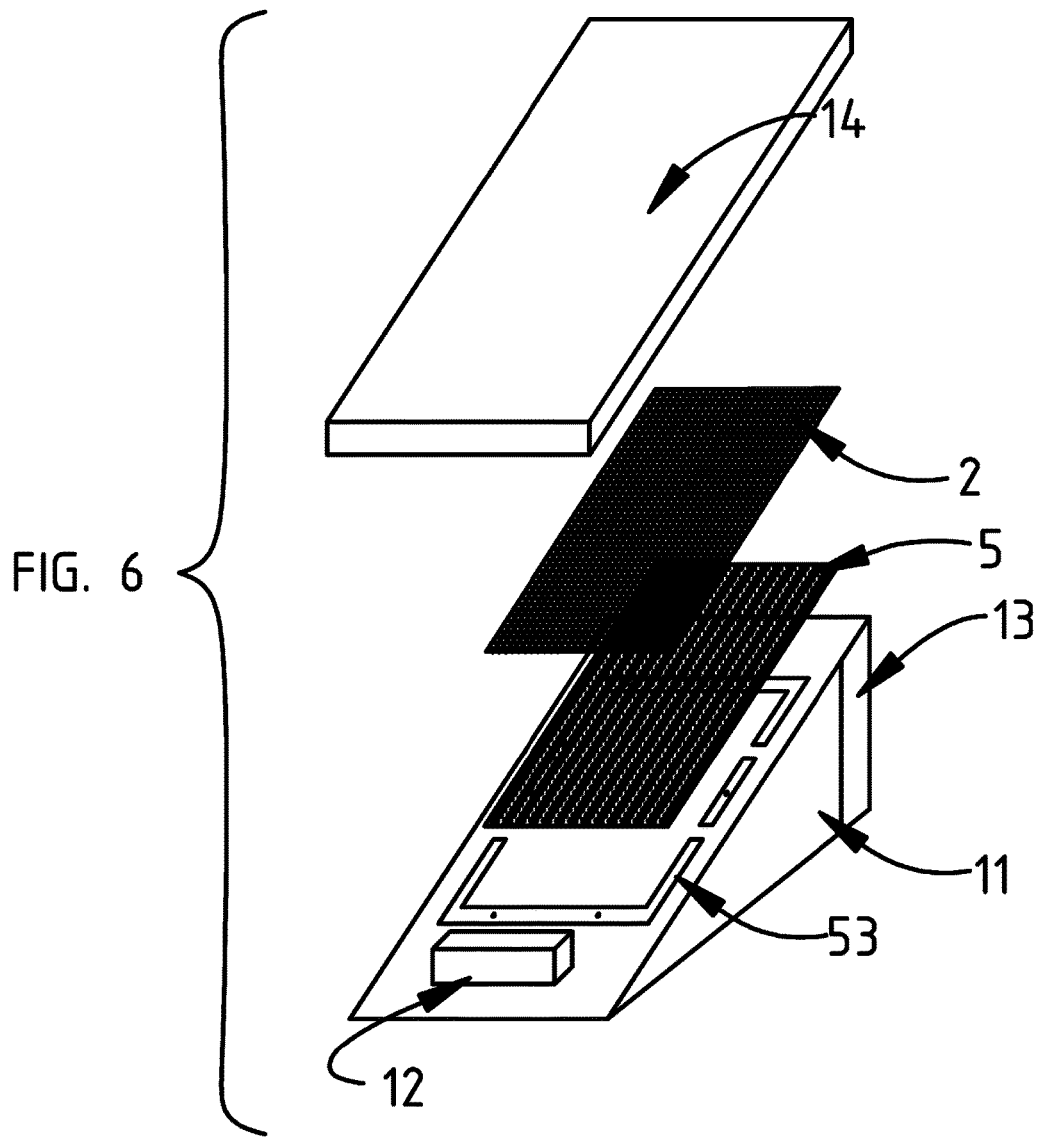
FIG. 6 is an exploded view of the input output converter combination of FIG. 5

FIGS. 5 and 6 detail an angled converter 11 system wherein a tablet computer or mobile phone 14 touchscreen faces toward an input converter 2 and an output converter 5 and held in place by 53 recessed vacuum channels with vacuum orifices and a stop 12 with enclosed electronics 13.

Figure 7:
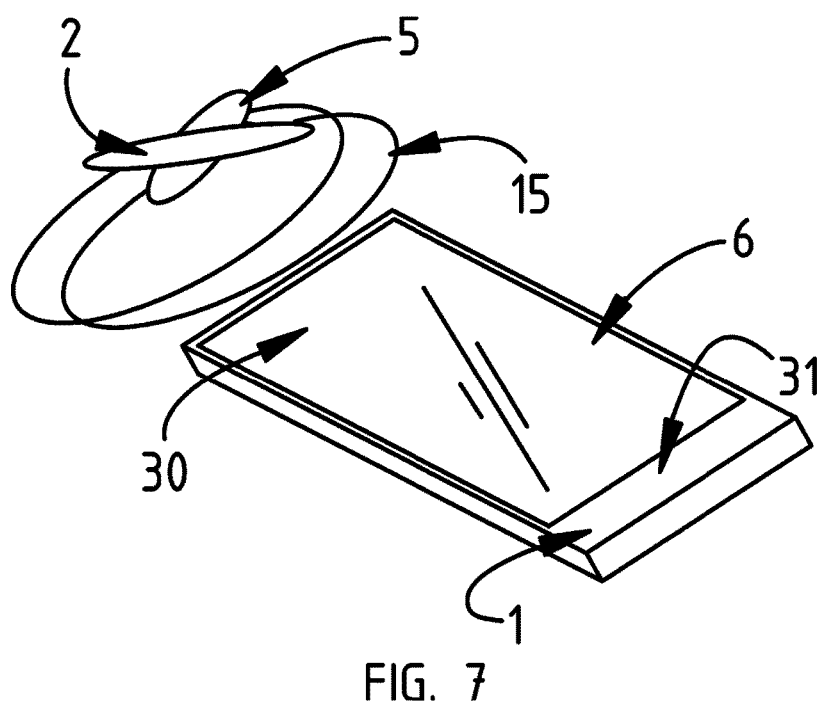
FIG. 7 is a perspective view of an ornamentally shaped tablet computer and mobile phone input and output converter system according to this invention

FIG. 7 details an ornamentally shaped output converter 5 and input converter 2 which have neodinium composition for clamping force along with a garter 15 which fits around or over a touchscreen 6. For alignment to the mobile phone or tablet computer 1 software displays a fiducial like marker 30 on the screen or touch pad/sense area 31 to allow the user to correctly align the converters.

Figure 8:
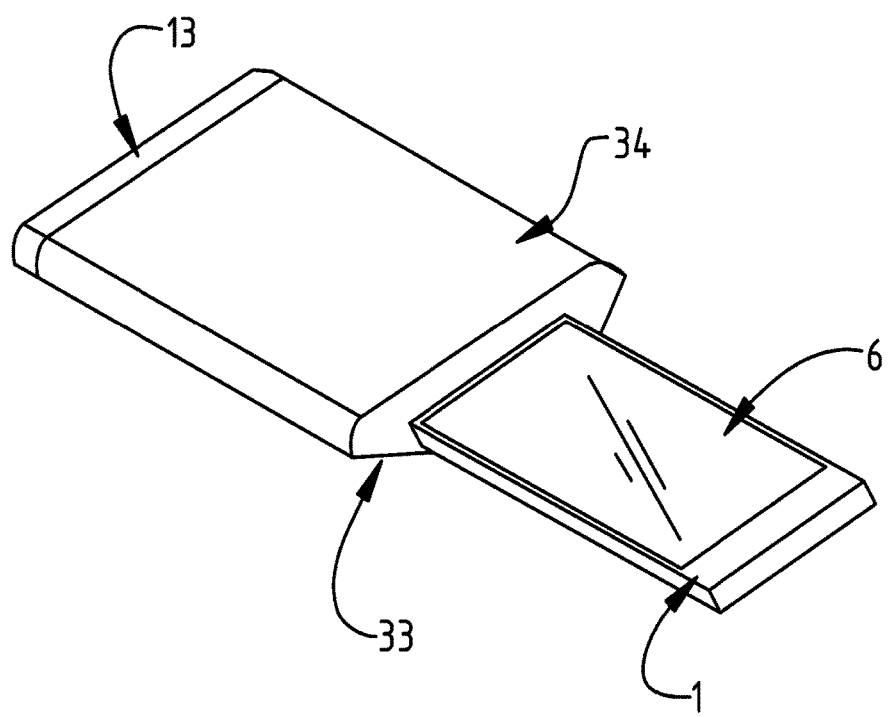
FIG. 8 is a perspective view of a sleeve tablet computer and mobile phone input and output converter system according to this invention

FIG. 8 details a sleeve tablet computer and mobile phone input and output converter elastic sleeve wherein the mobile phone or tablet computer 1 slides into the sleeve converter 34 which is comprised of elastic material 33 that secures the touchscreen 6 into proper alignment with the input converter and output converter with enclosed electronics 13.

Figure 9:
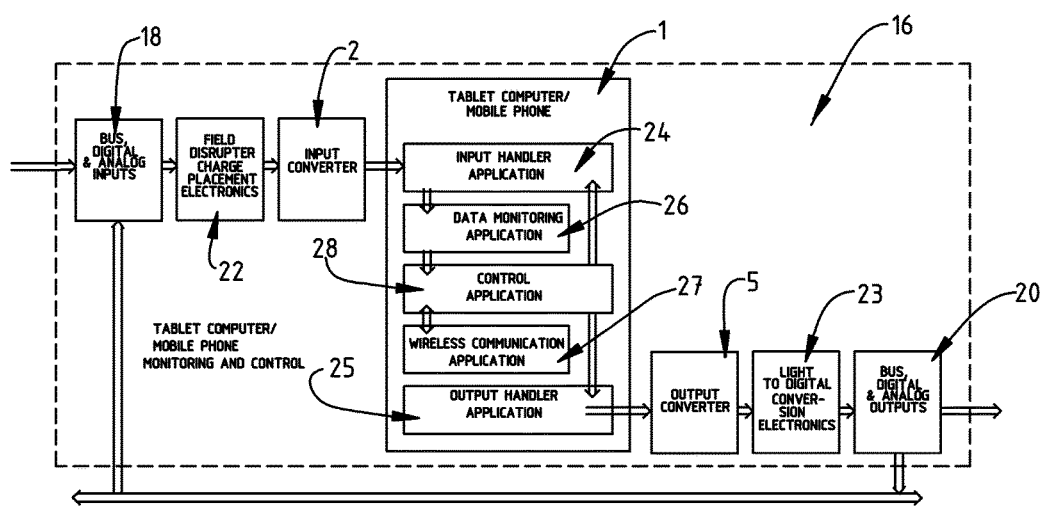
FIG. 9 is a schematic diagram illustrating the control of the input and output converter according to the embodiment of this invention

FIG. 9 details a single tablet computer/mobile phone monitoring and control system 16. Input is received from a bus or digital and analog inputs 18. Field disrupter charge placement electronics 22 send data to the input converter 2. The tablet computer/mobile phone 1 has an input handler 24, data monitoring 26, control 28, wireless communication 27, and an output handler 25. An output converter 5 and light to digital conversion electronics 23 produce bus, or digital or analog output 20.

Figure 10:
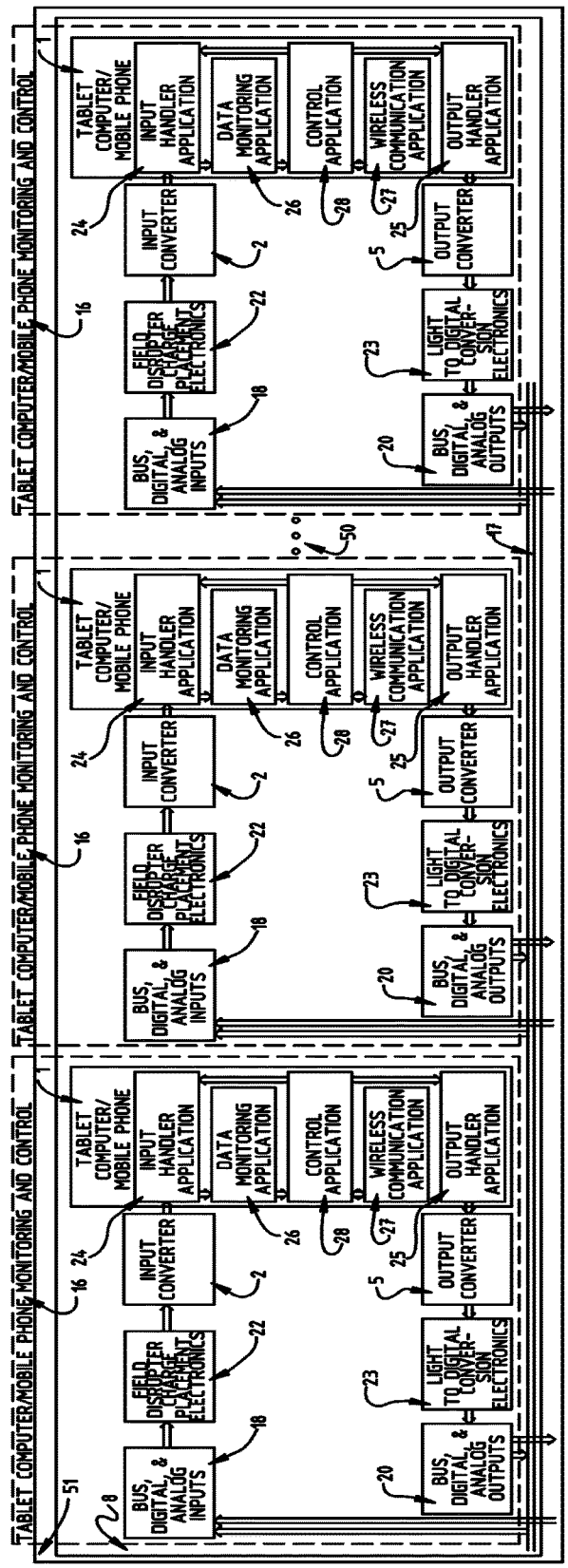
FIG. 10 is a multiple tablet computer/mobile phone schematic diagram illustrating the control of the input and output converters according to the embodiment of this invention

FIG. 10 The monitoring and control system shown comprises a larger scalable 50 system 8. A rack mount unit facilitates a larger system 51 more readily via a common back-plane or bus 17. Other units can coalesce via wireless communication to obtain multiprocessing or parallelism embodied in 51. A plurality of individual systems 16 embodied as an individual enclosure, sleeve, rack, angled surface, elastic band, combine into a larger system 51. The detail of each individual system 16 is as follows: Input is received from a bus or digital and analog inputs 18. Field disrupter charge placement electronics 22 send data to an input converter 2. The tablet computer/mobile phone 1 has an input handler 24, data monitoring 26, control 28, wireless communication 27, and an output handler 25. An output converter 5 and light to digital conversion electronics 23 produce bus, or digital or analog output 20.

Figure 11:
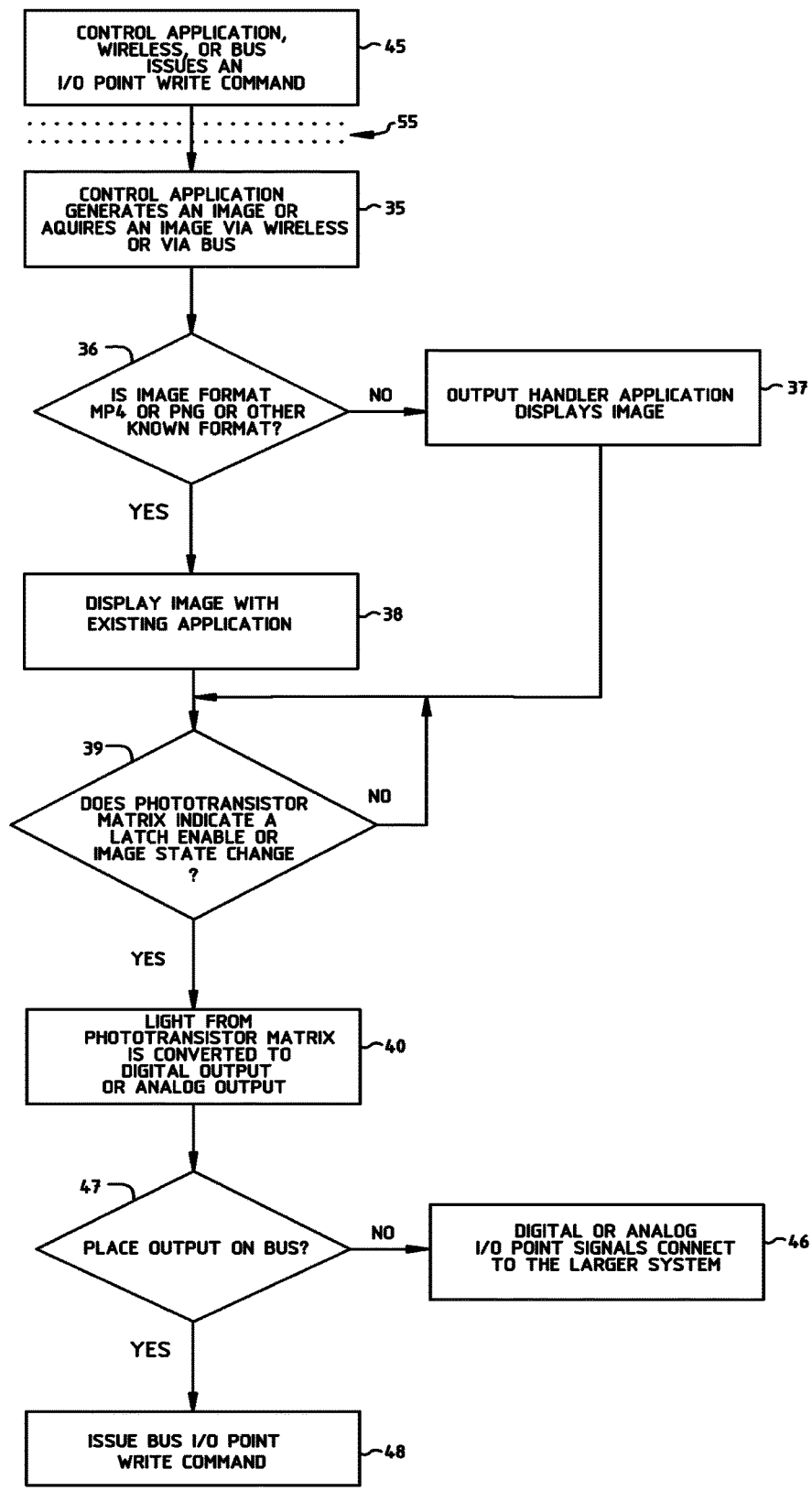
FIG. 11 is a flow diagram of the procedure for producing digital output of FIG. 9

FIG. 11 illustrates a flow chart describing a procedure for generating digital output from a mobile phone or tablet computer. In step 45 the control application on the tablet or phone itself is issuing a write command or is doing so in response to a wireless request to write or a bus request to write. At this point the program has reached a barrier 55 to facilitate other output converters in a parallel system to synchronize for real-time parallel computing. An image is either generated or acquired 35 to present to the phototransistor matrix to convert to output. It is important to see that in many cases it is not necessary to write special software for displaying the images since most mobile phones and tablets are designed just for that purpose and existing applications can be utilized saving software engineering cost and taking advantage of the universal image and video formats 36. The image is displayed with a custom output handler application 37 or with an existing application 38. Each frame of video or an image has a change state bit (region of pixels, dot, or square) when this changes 39 it causes the data to be latched and converted to digital output data or analog output 40 to be placed on a bus 47 wherein a bus input or output write command is issued 48 or the digital or analog input or output point is connected to a larger system 46.

Figure 12:
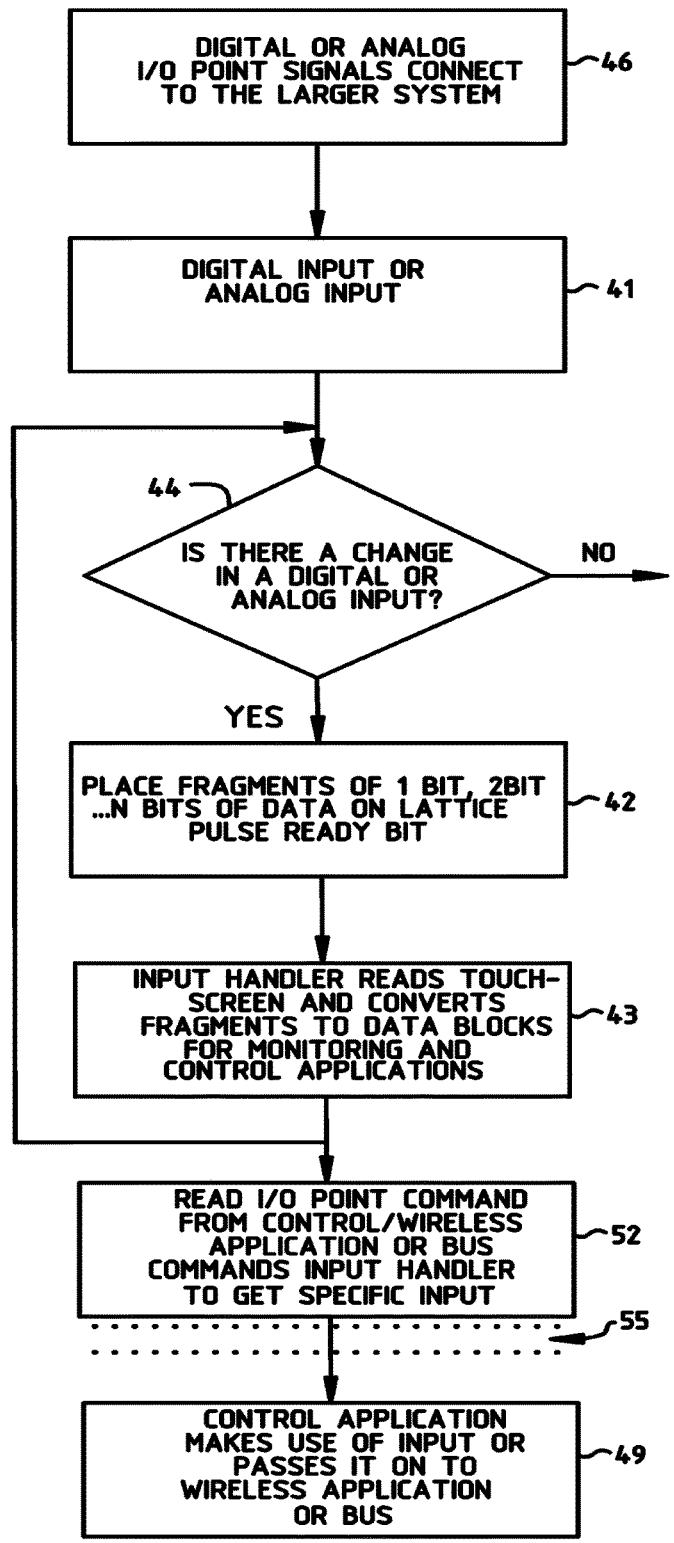
FIG. 12 is a flow diagram of the procedure for producing digital input of FIG. 9

FIG. 12 illustrates a flow chart describing the procedure for input 41 from digital or analog I/O signals from the larger system 46. An input list is scanned or a maskable (allowing prioritized culling) list of interrupts for input 44 indicates a new input is available. Fragments of 1 bit, 2 bit . . . n bits of data are placed on the lattice 42. The input handler reads the touch screen and converts fragments to data blocks 43. Input that has changed and is not culled or masked off is read in 52 The specific parts of the lattice are read for the input and at this point a software barrier is reached 55 to allow for synchronization of other mobile phone or tablet computer input converters when used in a parallel system and when all input converters are at the barrier the control application makes use of the input or passes it on to a wireless or bus output 49.

Figure 13:
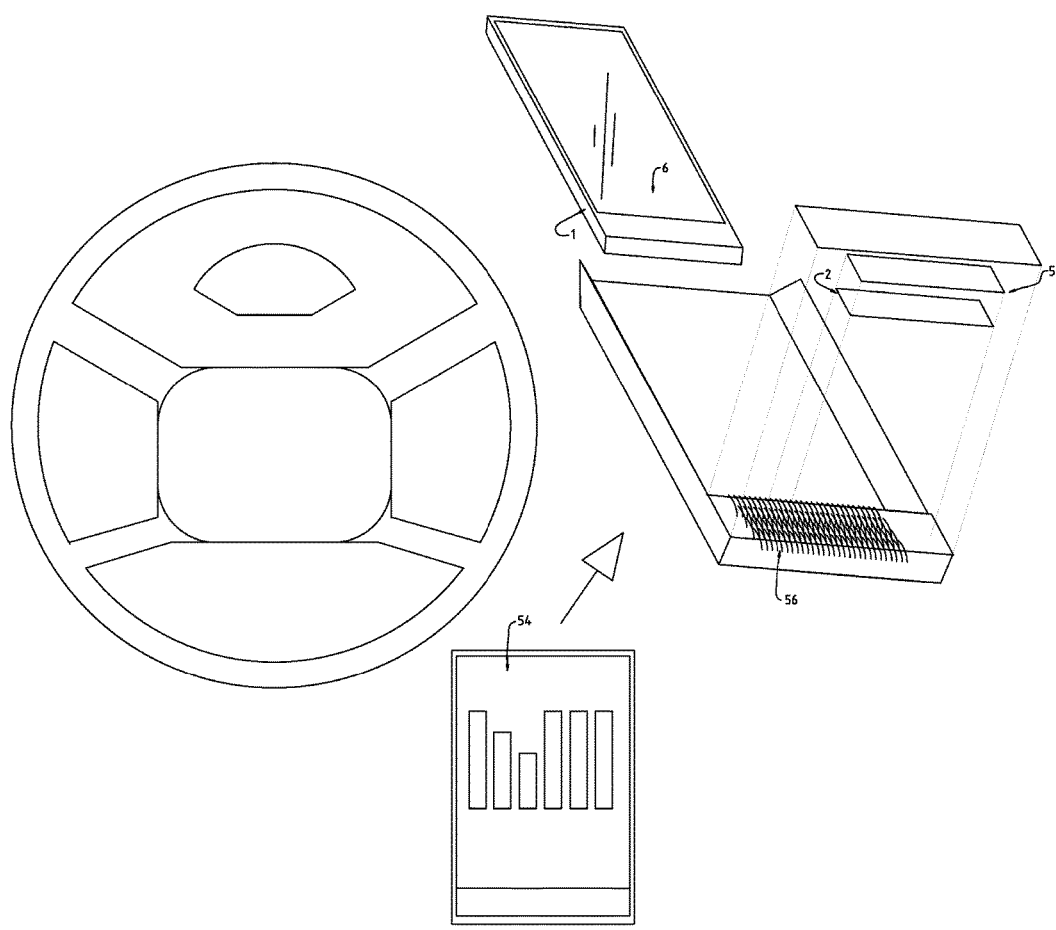
FIG. 13 is an embodiment of the invention to interface with vehicles

FIG. 13 shows a mobile phone and tablet computer input and output converter for use in an vehicular application secured with bristles 56 which push the mobile phone or tablet computer 1 touchscreen 6 into the input converter 2 and the output converter 5 but allows for easy insertion and removal. This facilitates the mobile phone or tablet computer to interface with the vehicle computer to display the automobiles parameters with for example bar charts 54 showing speed, tach, oil pressure, temperature . . . . Screens for climate control and radio or media, gps and robotic control of the vehicle can also be applications. This system allows for interfacing any number of brands of tablets and mobile phones to a vehicle without using wireless offering immunity from wireless hacking.

Figure 14:
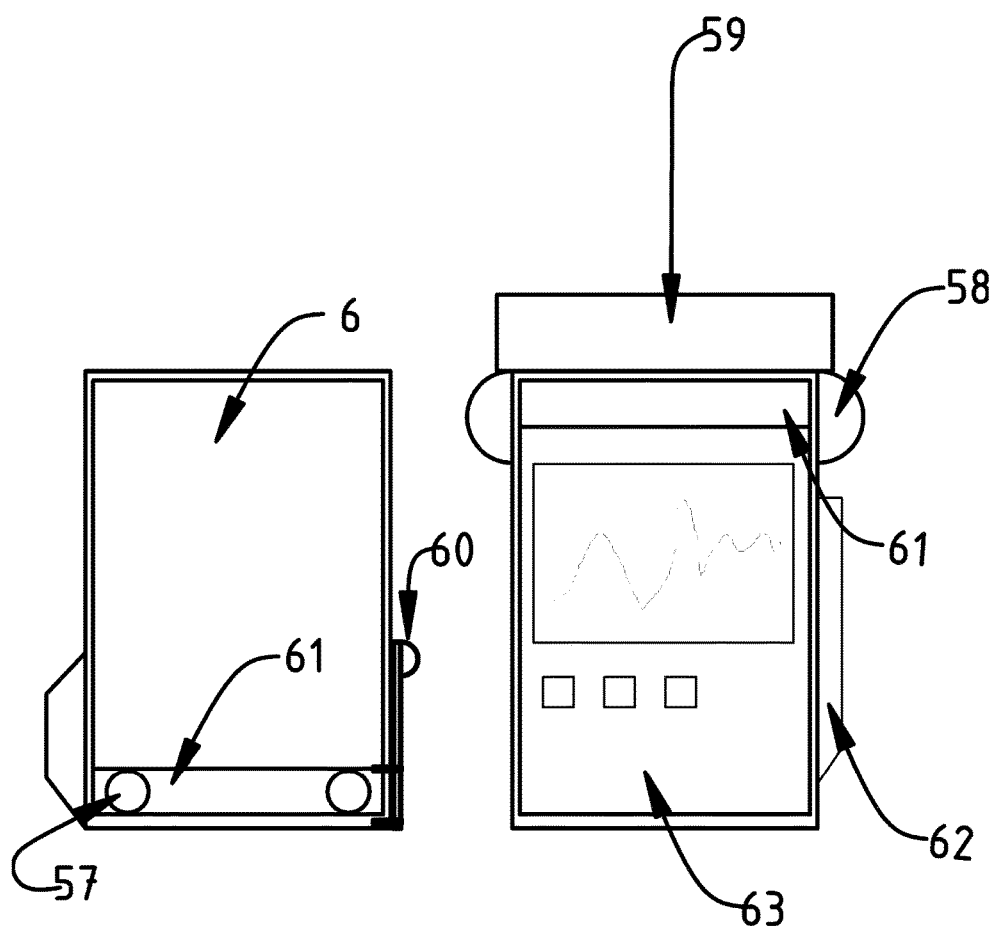
FIG. 14 is an embodiment of the invention to allow the mobile phone or tablet computer to be a an instrumented sensor and diagnostic platform

FIG. 14 shows an embodiment of the invention as a sensor platform (herein-after referred to as a muli-corder) with the mobile phone and tablet computer input and output converter secured with a ferrous ear 58 that hinges onto a neodymium magnet fixed inside a blister or ear appendage of a case to clamp the mobile phone and tablet computer input and output converter 61 to the touchscreen 6 which also at its top houses a sensor array 59 and on its side probes/probe storage 62 or a mechanical clamping method which uses lever action 60 to press mobile phone and tablet computer input and output converter against the touchscreen 6 where springs 57 mounted in the back casing allow a clamping of the mobile phone or tablet. Applications for data logging, trend analysis and diagnostics can be utilized 63.

Figure 15:
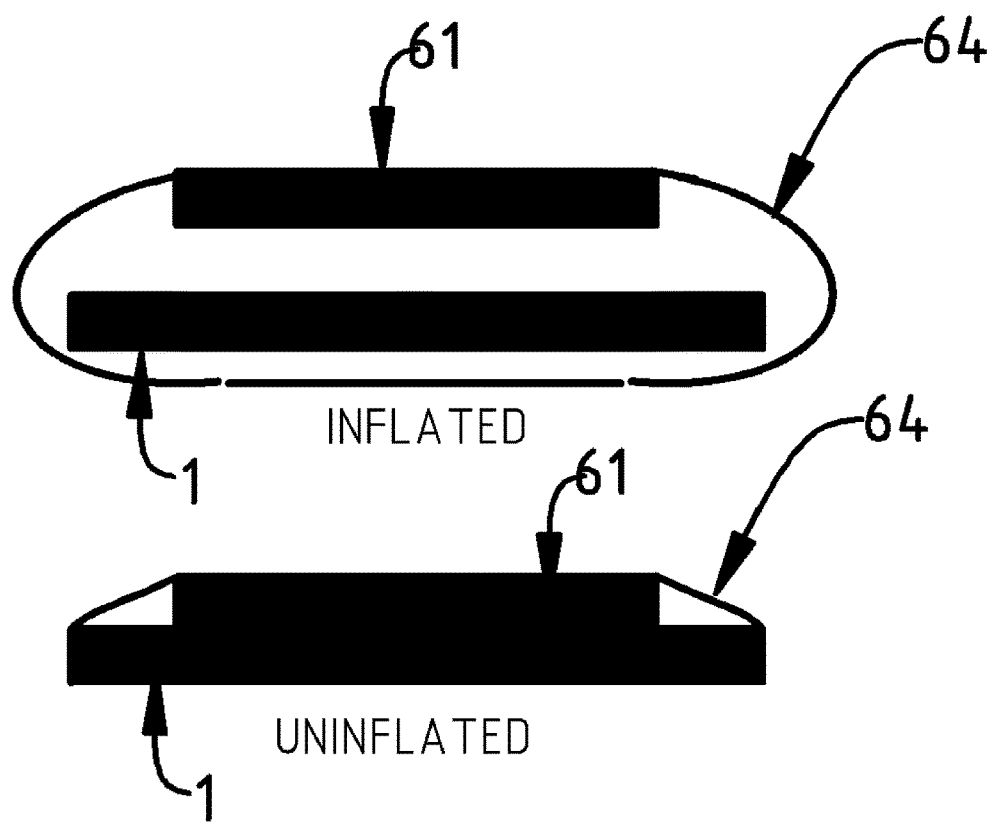
FIG. 15 is an inflatable tubing skeletal sleeve

FIG. 15 is an inflatable tubing skeletal sleeve with the mobile phone and tablet computer input and output converter mounted such that the inflatable tubing expands to allow the tablet to be inserted or removed but when deflated clamps the mobile phone and tablet computer input and output converter to the touchscreen.

Figure 16:
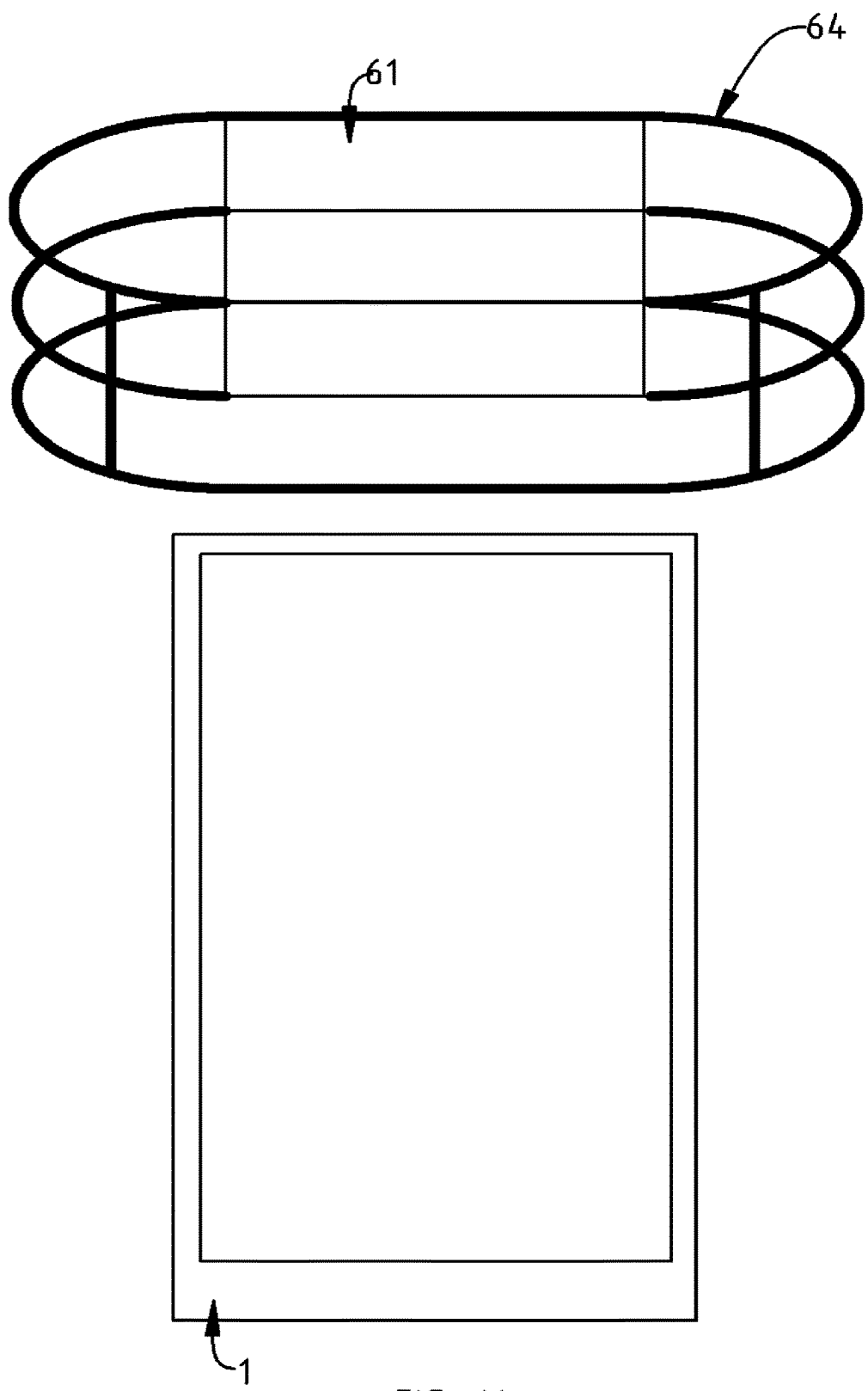
FIG. 16 is a second view of an inflatable tubing skeletal sleeve

FIG. 16 is an inflatable tubing 64 skeletal sleeve with the tablet computer and mobile phone input and output converter 61 mounted such that the inflatable tubing expands to allow the mobile phone or tablet computer 1 to be inserted or removed but when deflated clamps the mobile phone and tablet computer input and output converter to the touchscreen.

Figure 17:
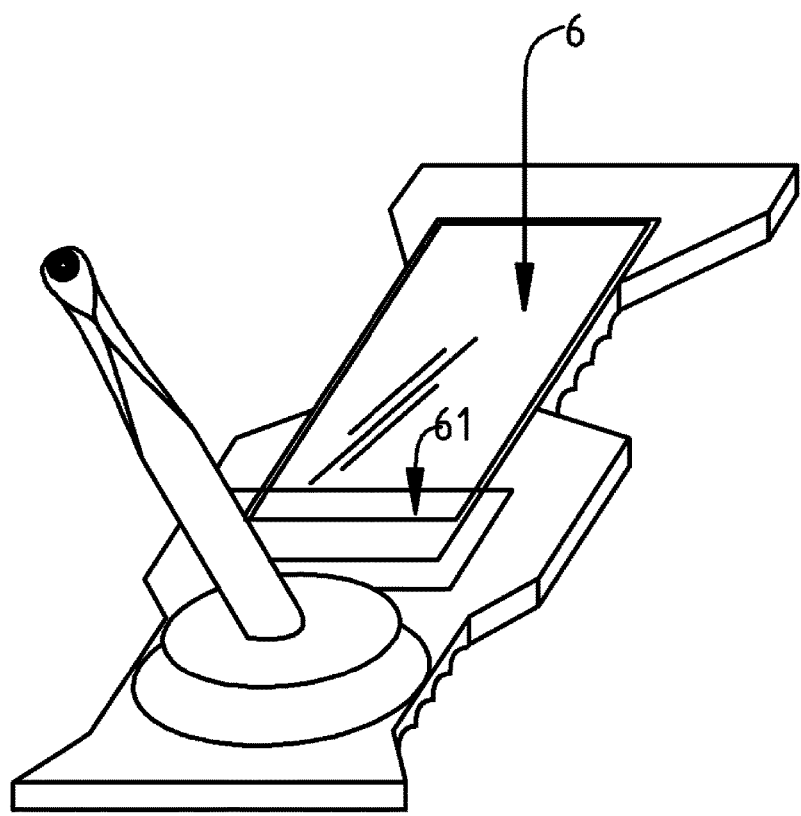
FIG. 17 is an embodiment of the invention which interfaces to a control stick

FIG. 17 is an embodiment of the invention where the mobile phone and tablet computer input converter and output converter 61 is used to connect to a control stick via the touchscreen 6.

Figure 18:
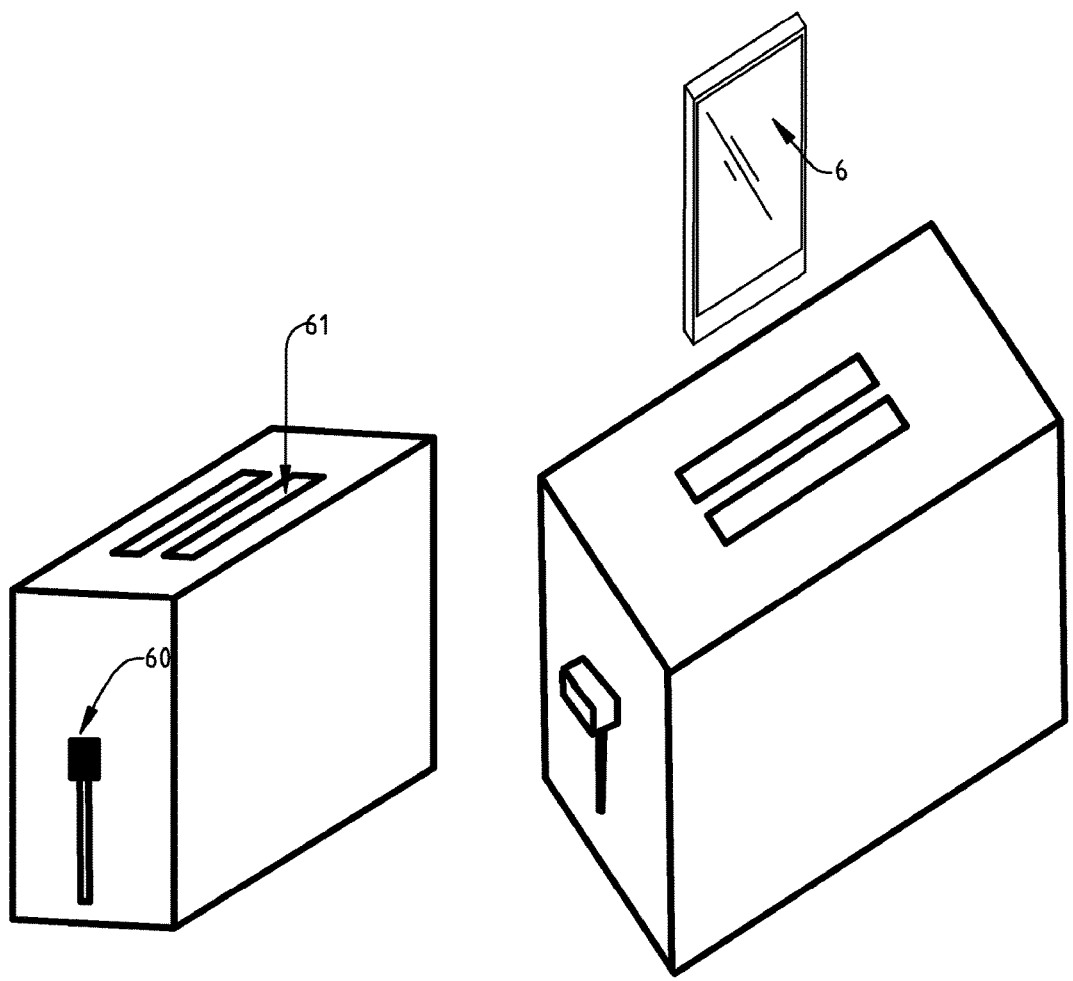
FIG. 18 is an embodiment of the invention in an easy to use enclosure

FIG. 18 is an embodiment of the invention where the mobile phone and tablet computer input converter and output converter 61 are inside of an enclosure with a spring loaded clamping mechanism with mechanical lever action 60 used to clamp at least one touchscreen 6 against the mobile phone and tablet computer input and output converter.

What is claimed is:

1. A mobile phone and tablet computer input and output converter that receives and transmits continuously variable input and output signals that are input to a mobile phone or tablet computer and output from a mobile phone or tablet computer, said signals each corresponding to one of: a discrete digital signal, an analog signal, a bus read, a bus write, information, output command information, or input status information, wherein the signals are concurrently transferred without using a central/master or host computer into and out of at least one mobile phone or tablet computer, the converter comprising:

an output converter consisting of a plurality of phototransistors, an associated or integrated electronic circuit, and programs which convert a plurality of pixels, dots or squares on a touchscreen of the mobile phone or tablet computer to output signals output from the mobile phone or tablet computer; and an input converter consisting of a plurality of conductor bodies or pluralities of conductor body groupings and an associated or integrated electronic circuit that converts received input signals to the mobile phone or tablet computer by using conductor bodies which are selectively electrified, which rapidly triggers a single simulated finger touch or no touch on the mobile phone or tablet computer touchscreen, wherein continuous streams of several simulated finger touches may be generated on an individual touchscreen simultaneously by electrifying pluralities of conductor bodies simultaneously which then are converted by programs on the mobile phone or tablet computer to a plurality of input signals into the mobile phone or tablet computer, wherein the mobile phone and tablet computer input and output converter is used for continuous monitoring of a plurality of input points, and continuous control of a plurality of output points concurrent with any other mobile phones or tablet computers with input and output converter and connected to the same bus or wireless connection, wherein the input converter conductor bodies have at least one integrated electromagnet, which when active draw the conductor bodies toward the touchscreen surface to a magnetic material appendage or magnetic parts manufactured into a mobile phone or tablet computer securely clamping an input and output computer to the touchscreen of a mobile phone or tablet computer.

2. A mobile phone and tablet computer input and output converter that receives and transmits continuously variable input and output signals that are input to a mobile phone or tablet computer and output from a mobile phone or tablet computer, said signals each corresponding to one of: a discrete digital signal, an analog signal, a bus read, a bus write, information, output command information, or input status information, wherein the signals are concurrently transferred without using a central/master or host computer into and out of at least one mobile phone or tablet computer, the converter comprising:

an output converter consisting of a plurality of phototransistors, an associated or integrated electronic circuit, and programs which convert a plurality of pixels, dots or squares on a touchscreen of the mobile phone or tablet computer to output signals output from the mobile phone or tablet computer; and an input converter consisting of a plurality of conductor bodies or pluralities of conductor body groupings and an associated or integrated electronic circuit that converts received input signals to the mobile phone or tablet computer by using conductor bodies which are selectively electrified, which rapidly triggers a single simulated finger touch or no touch on the mobile phone or tablet computer touchscreen, wherein continuous streams of several simulated finger touches may be generated on an individual touchscreen simultaneously by electrifying pluralities of conductor bodies simultaneously which then are converted by programs on the mobile phone or tablet computer to a plurality of input signals into the mobile phone or tablet computer, wherein the mobile phone and tablet computer input and output converter is used for continuous monitoring of a plurality of input points, and continuous control of a plurality of output points concurrent with any other mobile phones or tablet computers with input and output converter and connected to the same bus or wireless connection, wherein a phototransistor matrix used for output and conductor bodies used for input are integrated with neodymium or have a neodymium appendage, wherein magnetism in the neodymium pulls a mobile phone or tablet computer touchscreen against the converter by attractive forces between the converter and existing magnetic parts or a magnetic appendage of the mobile phone or tablet computer, wherein the converter has a releasing mechanical action, electromechanical action, hydraulic action, flow reversal of vacuum to pressurized air, or an air bag which when inflated, separates mobile phone or tablet computer from magnetic clamping force.

3. A mobile phone and tablet computer input and output converter that receives and transmits continuously variable input and output signals that are input to a mobile phone or tablet computer and output from a mobile phone or tablet computer, said signals each corresponding to one of: a discrete digital signal, an analog signal, a bus read, a bus write, information, output command information, or input status information, wherein the signals are concurrently transferred without using a central/master or host computer into and out of at least one mobile phone or tablet computer, the converter comprising:

an output converter consisting of a plurality of phototransistors, an associated or integrated electronic circuit, and programs which convert a plurality of pixels, dots or squares on a touchscreen of the mobile phone or tablet computer to output signals output from the mobile phone or tablet computer; and an input converter consisting of a plurality of conductor bodies or pluralities of conductor body groupings and an associated or integrated electronic circuit that converts received input signals to the mobile phone or tablet computer by using conductor bodies which are selectively electrified, which rapidly triggers a single simulated finger touch or no touch on the mobile phone or tablet computer touchscreen, wherein continuous streams of several simulated finger touches may be generated on an individual touchscreen simultaneously by electrifying pluralities of conductor bodies simultaneously which then are converted by programs on the mobile phone or tablet computer to a plurality of input signals into the mobile phone or tablet computer, wherein the mobile phone and tablet computer input and output converter is used for continuous monitoring of a plurality of input points, and continuous control of a plurality of output points concurrent with any other mobile phones or tablet computers with input and output converter and connected to the same bus or wireless connection, wherein the phototransistor matrix used for output and conductor bodies used for input are integrated as part of a small ornament which can be worn on a bracelet or chain with unique form or shape functioning at least as a simple security key or at the most a complex cypher key (herein-after referred to as a converter charm key) to enable the mobile phone or tablet computer to operate or software on the mobile phone or tablet computer to operate, wherein an adhesive or neodymium (or other magnetic) composition of the input and output converter is used to attach the converter charm key to a mobile phone or tablet computer touchscreen surface or mobile phone or tablet computer appendage or screw threads manufactured into or appended to the mobile phone or tablet computer allowing the converter charm key to twist downward onto the surface of a mobile phone or tablet computer touchscreen to hold the converter charm key to the mobile phone or tablet computer or to an appendage of the mobile phone or tablet computer or a software displayed aiming point on the touchscreen and functioning as a security key to allow the mobile phone or tablet computer to function or software on a mobile phone or tablet computer to function.

4. A mobile phone and tablet computer input and output converter that receives and transmits continuously variable input and output signals that are input to a mobile phone or tablet computer and output from a mobile phone or tablet computer, said signals each corresponding to one of: a discrete digital signal, an analog signal, a bus read, a bus write, information, output command information, or input status information, wherein the signals are concurrently transferred without using a central/master or host computer into and out of at least one mobile phone or tablet computer, the converter comprising:

an output converter consisting of a plurality of phototransistors, an associated or integrated electronic circuit, and programs which convert a plurality of pixels, dots or squares on a touchscreen of the mobile phone or tablet computer to output signals output from the mobile phone or tablet computer; and an input converter consisting of a plurality of conductor bodies or pluralities of conductor body groupings and an associated or integrated electronic circuit that converts received input signals to the mobile phone or tablet computer by using conductor bodies which are selectively electrified, which rapidly triggers a single simulated finger touch or no touch on the mobile phone or tablet computer touchscreen, wherein continuous streams of several simulated finger touches may be generated on an individual touchscreen simultaneously by electrifying pluralities of conductor bodies simultaneously which then are converted by programs on the mobile phone or tablet computer to a plurality of input signals into the mobile phone or tablet computer, wherein the mobile phone and tablet computer input and output converter is used for continuous monitoring of a plurality of input points, and continuous control of a plurality of output points concurrent with any other mobile phones or tablet computers with input and output converter and connected to the same bus or wireless connection, wherein each conductor body has at least one vacuum orifice nearby in recessed channels around the conductor body, which when active draw the conductor body toward the touchscreen surface effectively clamping to the touchscreen of a mobile phone or tablet computer mobile phone and tablet computer input and output converter, wherein the converter has a releasing mechanical action, electromechanical action, hydraulic action, flow reversal of vacuum to pressurized air, or an air bag which when inflated, separates the mobile phone or tablet computer from the mobile phone and tablet computer input and output converter.

5. A mobile phone and tablet computer input and output converter that receives and transmits continuously variable input and output signals that are input to a mobile phone or tablet computer and output from a mobile phone or tablet computer, said signals each corresponding to one of: a discrete digital signal, an analog signal, a bus read, a bus write, information, output command information, or input status information, wherein the signals are concurrently transferred without using a central/master or host computer into and out of at least one mobile phone or tablet computer, the converter comprising:

an output converter consisting of a plurality of phototransistors, an associated or integrated electronic circuit, and programs which convert a plurality of pixels, dots or squares on a touchscreen of the mobile phone or tablet computer to output signals output from the mobile phone or tablet computer; and an input converter consisting of a plurality of conductor bodies or pluralities of conductor body groupings and an associated or integrated electronic circuit that converts received input signals to the mobile phone or tablet computer by using conductor bodies which are selectively electrified, which rapidly triggers a single simulated finger touch or no touch on the mobile phone or tablet computer touchscreen, wherein continuous streams of several simulated finger touches may be generated on an individual touchscreen simultaneously by electrifying pluralities of conductor bodies simultaneously which then are converted by programs on the mobile phone or tablet computer to a plurality of input signals into the mobile phone or tablet computer, wherein the mobile phone and tablet computer input and output converter is used for continuous monitoring of a plurality of input points, and continuous control of a plurality of output points concurrent with any other mobile phones or tablet computers with input and output converter and connected to the same bus or wireless connection, wherein mobile phone and tablet computer input and output converter is secured with an expandable tubing constructed in a web or skeletal form, which under normal conditions squeezes tightly around a mobile phone or tablet computer but when inflated expands in size and releases the mobile phone or tablet computer for removal or insertion.

6. A mobile phone and tablet computer input and output converter that receives and transmits continuously variable input and output signals that are input to a mobile phone or tablet computer and output from a mobile phone or tablet computer, said signals each corresponding to one of: a discrete digital signal, an analog signal, a bus read, a bus write, information, output command information, or input status information, wherein the signals are concurrently transferred without using a central/master or host computer into and out of at least one mobile phone or tablet computer, the converter comprising:

an output converter consisting of a plurality of phototransistors, an associated or integrated electronic circuit, and programs which convert a plurality of pixels, dots or squares on a touchscreen of the mobile phone or tablet computer to output signals output from the mobile phone or tablet computer; and an input converter consisting of a plurality of conductor bodies or pluralities of conductor body groupings and an associated or integrated electronic circuit that converts received input signals to the mobile phone or tablet computer by using conductor bodies which are selectively electrified, which rapidly triggers a single simulated finger touch or no touch on the mobile phone or tablet computer touchscreen, wherein continuous streams of several simulated finger touches may be generated on an individual touchscreen simultaneously by electrifying pluralities of conductor bodies simultaneously which then are converted by programs on the mobile phone or tablet computer to a plurality of input signals into the mobile phone or tablet computer, wherein the mobile phone and tablet computer input and output converter is used for continuous monitoring of a plurality of input points, and continuous control of a plurality of output points concurrent with any other mobile phones or tablet computers with input and output converter and connected to the same bus or wireless connection, wherein the validity of input is checked for correctness as it flows continuously into and out of each mobile phone or tablet computer via an exclusive or (xor) comparison logic circuit coupled between an input converter and an output converter, wherein the overall integrity of the input and output are checked for correctness and software adapts to not use failing parts of the converter but continues to operate, wherein the mobile phone and tablet computer input and output converter adapt to various dimensions of touchscreens.

7. A mobile phone and tablet computer input and output converter that receives and transmits continuously variable input and output signals that are input to a mobile phone or tablet computer and output from a mobile phone or tablet computer, said signals each corresponding to one of: a discrete digital signal, an analog signal, a bus read, a bus write, information, output command information, or input status information, wherein the signals are concurrently transferred without using a central/master or host computer into and out of at least one mobile phone or tablet computer, the converter comprising:

an output converter consisting of a plurality of phototransistors, an associated or integrated electronic circuit, and programs which convert a plurality of pixels, dots or squares on a touchscreen of the mobile phone or tablet computer to output signals output from the mobile phone or tablet computer; and an input converter consisting of a plurality of conductor bodies or pluralities of conductor body groupings and an associated or integrated electronic circuit that converts received input signals to the mobile phone or tablet computer by using conductor bodies which are selectively electrified, which rapidly triggers a single simulated finger touch or no touch on the mobile phone or tablet computer touchscreen, wherein continuous streams of several simulated finger touches may be generated on an individual touchscreen simultaneously by electrifying pluralities of conductor bodies simultaneously which then are converted by programs on the mobile phone or tablet computer to a plurality of input signals into the mobile phone or tablet computer, wherein the mobile phone and tablet computer input and output converter is used for continuous monitoring of a plurality of input points, and continuous control of a plurality of output points concurrent with any other mobile phones or tablet computers with input and output converter and connected to the same bus or wireless connection, wherein the output converter phototransistors locations used can be configured robotically or algorithmically by said mobile phone and tablet computer input and output converter from a plurality of phototransistors and input converter conductor body locations used can be configured robotically or algorithmically by said mobile phone and tablet computer input and output converter, wherein small conductor bodies are combined by gated paths between them including light or photo activated gates between the conductor bodies to form larger conductor body shapes which can be configured from the plurality of smaller conductor bodies, wherein software automatically changes said larger shapes and their locations for adaptation during operation.

8. A mobile phone and tablet computer input and output converter that receives and transmits continuously variable input and output signals that are input to a mobile phone or tablet computer and output from a mobile phone or tablet computer, said signals each corresponding to one of: a discrete digital signal, an analog signal, a bus read, a bus write, information, output command information, or input status information, wherein the signals are concurrently transferred without using a central/master or host computer into and out of at least one mobile phone or tablet computer, the converter comprising:

an output converter consisting of a plurality of phototransistors, an associated or integrated electronic circuit, and programs which convert a plurality of pixels, dots or squares on a touchscreen of the mobile phone or tablet computer to output signals output from the mobile phone or tablet computer; and an input converter consisting of a plurality of conductor bodies or pluralities of conductor body groupings and an associated or integrated electronic circuit that converts received input signals to the mobile phone or tablet computer by using conductor bodies which are selectively electrified, which rapidly triggers a single simulated finger touch or no touch on the mobile phone or tablet computer touchscreen, wherein continuous streams of several simulated finger touches may be generated on an individual touchscreen simultaneously by electrifying pluralities of conductor bodies simultaneously which then are converted by programs on the mobile phone or tablet computer to a plurality of input signals into the mobile phone or tablet computer, wherein the mobile phone and tablet computer input and output converter is used for continuous monitoring of a plurality of input points, and continuous control of a plurality of output points concurrent with any other mobile phones or tablet computers with input and output converter and connected to the same bus or wireless connection, wherein the mobile phone and tablet computer input and output converter is pressed against the mobile phone or tablet computer touchscreen by a plurality of bristles on the inside back of an enclosure facing toward the back of the mobile phone and tablet computer allowing the mobile phone to slide into and out of the enclosure but pressing the mobile phone touchscreen or tablet touchscreen against the mobile phone and tablet computer input and output converter.

9. A mobile phone and tablet computer input and output converter that receives and transmits continuously variable input and output signals that are input to a mobile phone or tablet computer and output from a mobile phone or tablet computer, said signals each corresponding to one of: a discrete digital signal, an analog signal, a bus read, a bus write, information, output command information, or input status information, wherein the signals are concurrently transferred without using a central/master or host computer into and out of at least one mobile phone or tablet computer, the converter comprising:

an output converter consisting of a plurality of phototransistors, an associated or integrated electronic circuit, and programs which convert a plurality of pixels, dots or squares on a touchscreen of the mobile phone or tablet computer to output signals output from the mobile phone or tablet computer; and an input converter consisting of a plurality of conductor bodies or pluralities of conductor body groupings and an associated or integrated electronic circuit that converts received input signals to the mobile phone or tablet computer by using conductor bodies which are selectively electrified, which rapidly triggers a single simulated finger touch or no touch on the mobile phone or tablet computer touchscreen, wherein continuous streams of several simulated finger touches may be generated on an individual touchscreen simultaneously by electrifying pluralities of conductor bodies simultaneously which then are converted by programs on the mobile phone or tablet computer to a plurality of input signals into the mobile phone or tablet computer, wherein the mobile phone and tablet computer input and output converter is used for continuous monitoring of a plurality of input points, and continuous control of a plurality of output points concurrent with any other mobile phones or tablet computers with input and output converter and connected to the same bus or wireless connection, wherein the mobile phone and tablet computer input and output converter are combined with an enclosure, wherein clamping is achieved by spring loaded force, mechanical action, electromechanical action, hydraulic action, vacuum, magnetism, electromagnetism, bristles, expandable tubing, an elastic sleeve, or an air bag which when inflated or deflated clamps the mobile phone or tablet computer touchscreen against the mobile phone and tablet computer input and output converter, wherein the mobile phone and tablet computer input and output converter has a releasing mechanical action, electromechanical action, hydraulic action, a change in magnetic force, flow reversal of vacuum to pressurized air, inflation of expandable tubing, or an air bag which when inflated or deflated separates the mobile phone or tablet computer from clamping force for insertion or removal.

10. The mobile phone and tablet computer input and output converter of claim 9, wherein the mobile phone and tablet computer input and output converter is an enclosure with at least one slot on top, wherein a lever on the side when pressed down draws the mobile phone or tablet into a slot while clamping the mobile phone touchscreen or tablet computer touchscreen to the mobile phone and tablet computer input and output converter.

11. A mobile phone and tablet computer input and output converter that receives and transmits continuously variable input and output signals that are input to a mobile phone or tablet computer and output from a mobile phone or tablet computer, said signals each corresponding to one of: a discrete digital signal, an analog signal, a bus read, a bus write, information, output command information, or input status information, wherein the signals are concurrently transferred without using a central/master or host computer into and out of at least one mobile phone or tablet computer, the converter comprising:

an output converter consisting of a plurality of phototransistors, an associated or integrated electronic circuit, and programs which convert a plurality of pixels, dots or squares on a touchscreen of the mobile phone or tablet computer to output signals output from the mobile phone or tablet computer; and an input converter consisting of a plurality of conductor bodies or pluralities of conductor body groupings and an associated or integrated electronic circuit that converts received input signals to the mobile phone or tablet computer by using conductor bodies which are selectively electrified, which rapidly triggers a single simulated finger touch or no touch on the mobile phone or tablet computer touchscreen, wherein continuous streams of several simulated finger touches may be generated on an individual touchscreen simultaneously by electrifying pluralities of conductor bodies simultaneously which then are converted by programs on the mobile phone or tablet computer to a plurality of input signals into the mobile phone or tablet computer, wherein the mobile phone and tablet computer input and output converter is used for continuous monitoring of a plurality of input points, and continuous control of a plurality of output points concurrent with any other mobile phones or tablet computers with input and output converter and connected to the same bus or wireless connection, wherein said mobile phone and tablet computer input and output converter is flexible and adapts to varying contour and radii of curvature and warped surfaces of watch devices, mobile computing devices, mobile phones, handheld computers, tablet computers and touch sensing device and electric field characteristic change sensing device, and field anomoly sensing device, wherein said mobile phone and tablet computer input and output converter is used to enable as a key would software and hardware of said watch devices, mobile computing devices, mobile phones, handheld computers, tablet computers and touch sensing device and electric field characteristic change sensing device, and field anomoly sensing device.

12. A mobile phone and tablet computer input and output converter that receives and transmits continuously variable input and output signals that are input to a mobile phone or tablet computer and output from a mobile phone or tablet computer, said signals each corresponding to one of: a discrete digital signal, an analog signal, a bus read, a bus write, information, output command information, or input status information, wherein the signals are concurrently transferred without using a central/master or host computer into and out of at least one mobile phone or tablet computer, the converter comprising:

an output converter consisting of a plurality of phototransistors, an associated or integrated electronic circuit, and programs which convert a plurality of pixels, dots or squares on a touchscreen of the mobile phone or tablet computer to output signals output from the mobile phone or tablet computer; and an input converter consisting of a plurality of conductor bodies or pluralities of conductor body groupings and an associated or integrated electronic circuit that converts received input signals to the mobile phone or tablet computer by using conductor bodies which are selectively electrified, which rapidly triggers a single simulated finger touch or no touch on the mobile phone or tablet computer touchscreen, wherein continuous streams of several simulated finger touches may be generated on an individual touchscreen simultaneously by electrifying pluralities of conductor bodies simultaneously which then are converted by programs on the mobile phone or tablet computer to a plurality of input signals into the mobile phone or tablet computer, wherein the mobile phone and tablet computer input and output converter is used for continuous monitoring of a plurality of input points, and continuous control of a plurality of output points concurrent with any other mobile phones or tablet computers with input and output converter and connected to the same bus or wireless connection, wherein a mobile phone and tablet computer input and output converter is clamped to the mobile phone or tablet computer with magnetic force, vacuum force, air force (pneumatic force), electromechanical force, mechanical force, hydraulic force, screw threads, wherein the converter has a releasing mechanical action, electromechanical action, hydraulic action, flow reversal of vacuum to pressurized air, or an air bag which when inflated, separates mobile phone or tablet computer from the mobile phone and tablet computer input and output converter.

13. A mobile phone and tablet computer input and output converter that receives and transmits continuously variable input and output signals that are input to a mobile phone or tablet computer and output from a mobile phone or tablet computer, said signals each corresponding to one of: a discrete digital signal, an analog signal, a bus read, a bus write, information, output command information, or input status information, wherein the signals are concurrently transferred without using a central/master or host computer into and out of at least one mobile phone or tablet computer, the converter comprising:

an output converter consisting of a plurality of phototransistors, an associated or integrated electronic circuit, and programs which convert a plurality of pixels, dots or squares on a touchscreen of the mobile phone or tablet computer to output signals output from the mobile phone or tablet computer; and an input converter consisting of a plurality of conductor bodies or pluralities of conductor body groupings and an associated or integrated electronic circuit that converts received input signals to the mobile phone or tablet computer by using conductor bodies which are selectively electrified, which rapidly triggers a single simulated finger touch or no touch on the mobile phone or tablet computer touchscreen, wherein continuous streams of several simulated finger touches may be generated on an individual touchscreen simultaneously by electrifying pluralities of conductor bodies simultaneously which then are converted by programs on the mobile phone or tablet computer to a plurality of input signals into the mobile phone or tablet computer, wherein the mobile phone and tablet computer input and output converter is used for continuous monitoring of a plurality of input points, and continuous control of a plurality of output points concurrent with any other mobile phones or tablet computers with input and output converter and connected to the same bus or wireless connection, wherein said mobile phone and tablet computer input and output converter combined with the mobile phone or tablet computer or a mobile computing device comprise a multi-corder (hereinafter referred to as a multi-corder) comprising a sensor array, remote probes, applications software for data logging, trend analysis, and diagnostics.

14. A mobile phone and tablet computer input and output converter that receives and transmits continuously variable input and output signals that are input to a mobile phone or tablet computer and output from a mobile phone or tablet computer, said signals each corresponding to one of: a discrete digital signal, an analog signal, a bus read, a bus write, information, output command information, or input status information, wherein the signals are concurrently transferred without using a central/master or host computer into and out of at least one mobile phone or tablet computer, the converter comprising:

an output converter consisting of a plurality of phototransistors, an associated or integrated electronic circuit, and programs which convert a plurality of pixels, dots or squares on a touchscreen of the mobile phone or tablet computer to output signals output from the mobile phone or tablet computer; and an input converter consisting of a plurality of conductor bodies or pluralities of conductor body groupings and an associated or integrated electronic circuit that converts received input signals to the mobile phone or tablet computer by using conductor bodies which are selectively electrified, which rapidly triggers a single simulated finger touch or no touch on the mobile phone or tablet computer touchscreen, wherein continuous streams of several simulated finger touches may be generated on an individual touchscreen simultaneously by electrifying pluralities of conductor bodies simultaneously which then are converted by programs on the mobile phone or tablet computer to a plurality of input signals into the mobile phone or tablet computer, wherein the mobile phone and tablet computer input and output converter is used for continuous monitoring of a plurality of input points, and continuous control of a plurality of output points concurrent with any other mobile phones or tablet computers with input and output converter and connected to the same bus or wireless connection, wherein built in touchscreen sensing of lighter, harder, quicker and non-standard anomolous non-human disruption of said mobile computing devices including tablet computers, mobile phones, watches and bracelet touchscreens is utilized by said mobile phone and tablet computer input and output converter.

15. A mobile phone and tablet computer input and output converter that receives and transmits continuously variable input and output signals that are input to a mobile phone or tablet computer and output from a mobile phone or tablet computer, said signals each corresponding to one of: a discrete digital signal, an analog signal, a bus read, a bus write, information, output command information, or input status information, wherein the signals are concurrently transferred without using a central/master or host computer into and out of at least one mobile phone or tablet computer, the converter comprising:

an output converter consisting of a plurality of phototransistors, an associated or integrated electronic circuit, and programs which convert a plurality of pixels, dots or squares on a touchscreen of the mobile phone or tablet computer to output signals output from the mobile phone or tablet computer; and an input converter consisting of a plurality of conductor bodies or pluralities of conductor body groupings and an associated or integrated electronic circuit that converts received input signals to the mobile phone or tablet computer by using conductor bodies which are selectively electrified, which rapidly triggers a single simulated finger touch or no touch on the mobile phone or tablet computer touchscreen, wherein continuous streams of several simulated finger touches may be generated on an individual touchscreen simultaneously by electrifying pluralities of conductor bodies simultaneously which then are converted by programs on the mobile phone or tablet computer to a plurality of input signals into the mobile phone or tablet computer, wherein the mobile phone and tablet computer input and output converter is used for continuous monitoring of a plurality of input points, and continuous control of a plurality of output points concurrent with any other mobile phones or tablet computers with input and output converter and connected to the same bus or wireless connection, wherein said continuous monitoring and said continuous control continues when a mobile phone or tablet computer or watch or other mobile computing device is removed from said mobile phone and tablet computer input and output converter, wherein said electronic circuits of the input converter and said electronic circuits of the output converter continue monitoring and control function without said removed mobile phone or tablet computer or watch or other mobile computing device, wherein a tablet computer or mobile phone, watch or other mobile computing device is used to download configuration and software into a mobile phone and tablet computer input and output converter and to upload data or software into a mobile phone or tablet computer or watch or other mobile computing device.

* * * * *